United States Patent [19]

Rosenau

[11] 4,098,856

[45] Jul. 4, 1978

[54] METHOD OF MAKING A COMPOSITE MOLD FOR MAKING POLYURETHANE FOAM DECORATIVE PARTS

[75] Inventor: Clifford M. Rosenau, Willow Street, Pa.

[73] Assignee: Armstrong Cork Company, Lancaster, Pa.

[21] Appl. No.: 831,992

[22] Filed: Sep. 9, 1977

Related U.S. Application Data

[63] Continuation of Ser. No. 644,752, Dec. 29, 1975, abandoned.

[51] Int. Cl.² .......................... B29C 1/02; B29F 5/00
[52] U.S. Cl. ...................... 264/80; 249/134; 264/225; 264/337
[58] Field of Search ........ 264/80, 220, 225, DIG. 77, 264/309, 313, 337, 338, 250, 255; 425/DIG. 44; 249/134

[56] References Cited

U.S. PATENT DOCUMENTS

| 2,113,166 | 4/1938 | Zinser | 264/220 |
|---|---|---|---|
| 3,030,259 | 4/1962 | Long | 264/309 |
| 3,291,882 | 12/1966 | Warner | 264/309 |
| 3,428,725 | 2/1969 | Delmonte et al. | 264/338 |
| 3,883,627 | 5/1975 | Fitts | 264/220 |
| 3,900,538 | 8/1975 | Kawakami | 264/80 |

*Primary Examiner*—James B. Lowe

[57] ABSTRACT

A method for making a composite mold utilizing room temperature vulcanizing silicone rubber for the surface of the mold and room temperature vulcanizing polyurethane rubber for the rest of the mold.

3 Claims, No Drawings

METHOD OF MAKING A COMPOSITE MOLD FOR MAKING POLYURETHANE FOAM DECORATIVE PARTS

CROSS-REFERENCE TO RELATED APPLICATION

This is a continuation of application Ser. No. 644,752, filed Dec. 29, 1975 now abandoned.

BACKGROUND OF THE INVENTION

1. Field of the Invention

The present invention relates to a molding process and, more particularly, to a molding process for forming a mold which will subsequently produce articles for furniture.

2. Description of the Prior Art

The state of the prior art is fully spelled out in U.S. Pat. No. 3,883,627. That patent, in addition to describing the solid silicone rubber molds, describes a composite silicone rubber mold having a vacuum formed sheet silicone rubber surface and a foamed polymeric backing.

The method herein, through the use of a sprayable silicone rubber compound, will provide greater mold detail over that which can be secured from a vacuum formed sheet. A sprayable silicone rubber compound will permit a build-up of material at weak points of the mold contour to reinforce the silicone rubber surface at those points where it is subject to great stress. Finally, the use of a solid backing permits the composite mold to better simulate a solid silicone rubber mold. A foam backing, if rigid, would be difficult to use with undercut areas of the mold and, if made flexible to overcome this problem, then it would be compressible and result in problems holding tolerances in the finished furniture article.

SUMMARY OF THE INVENTION

A pattern is secured for making the silicone mold. A room temperature vulcanizing silicone rubber is made up in a sprayable form and sprayed upon the pattern. The silicone rubber is permitted to cure and the exposed surface of the silicone rubber is then flame treated. The exposed surface of the silicone rubber is then covered with a suitable polyurethane rubber to form the composite mold. The composite mold will have a silicone rubber surface with fine detail and a solid polyurethane rubber backing to give the mold the desired strength and flexibility.

DESCRIPTION OF THE PREFERRED EMBODIMENT

As indicated in U.S. Pat. No. 3,883,627, the state of the art for making furniture molds is well known. Many different silicone rubber compounds are available for the purpose of making furniture molds. Molds will be made from silicone rubber and into the molds will be poured polyurethane, which will foam in the mold and form a rigid component which may be then placed upon a furniture unit. The invention herein is directed to a technique for making a mold adapted to form the foamed polyurethane furniture component.

A master or pattern of the furniture component to be formed is placed on a flat surface and an appropriate wall structure is formed therearound. This forms a mold cavity which will be used to make the composite mold which in turn will be the mold for forming the furniture component. The mold cavity with the master therein may be heated to about 180° to 200° F. to speed the cure of the silicone rubber which is to be subsequently applied. Generally any commercially available room temperature vulcanizing silicone liquid rubber compound may be used, and the compound is thinned by an appropriate solvent to a sprayable state. Silicone rubber compounds which can be used are Dow Silastic Q-38030 or General Electric RTV-664. These may be thinned to a sprayable consistency with a suitable solvent such as trichloroethylene, methyl ethyl ketone or toluene. Silicone rubber compounds are normally provided in two parts, and the two parts are mixed together just prior to use. The blended material is referred to as an activated silicone, and this is the material which is thinned to a sprayable consistency. The master and the inside parts of the mold cavity are sprayed with the sprayable silicone rubber to give a coating to the master and the mold cavity in the range of 0.005 to 0.020 of an inch in thickness. Certain areas of the mold being formed may have excessive wear or be subjected to excessive stress. These areas would be sprayed with extra silicone rubber to provide a thicker surface coating at those points. The coating of silicone rubber is then heated for about 2 hours at 150° F. to cure the coating. If desired, the silicone rubber spray coating could be placed on the master and the mold cavity as one spray coat or a plurality of spray coats, with gelling of the different spray coats between each application. Gelling can be carried out by heating the silicone for about 10 minutes at 275° F.

Normally, cured silicone rubber is a very difficult material to adhere to. Once the surface layer of silicone rubber has been placed over the master and the mold cavity and cured, the exposed surface of the silicone rubber is then subjected to a flame treatment which will now make that surface capable of adhering to the liquid polyurethane coating which will be cast on the back of the silicone rubber surface. Flame treatment consists of impinging momentarily the flame of a propane gas torch (or the equivalent) on the silicone surface to which other material is to be bonded. Care must be taken to assure that every area to be bonded is exposed to the flame.

After the flame treatment, a conventional liquid polyurethane casting material may be poured over the back of the silicone rubber surface layer to fill up the mold cavity and form a flexible backing bonded to the silicone rubber. A typical liquid polyurethane that may be used is Ren: C:O-Thane RP6401 made by Ren Plastics. This polyurethane is poured into the mold cavity over top of the sprayed-on silicone rubber coating, and the polyurethane is allowed to cure at ambient conditions for at least about two to three hours. The flame treatment has made it possible for the liquid polyurethane to bond to the silicone rubber. There has been formed a composite mold which has a solid polyurethane elastomer back with a silicone rubber mold surface. Into the now-formed mold one may pour foamable polyurethane to form furniture parts.

The composite mold above formed is similar in handling characteristics and size to conventional all-silicone rubber molds. The cast polyurethane foam furniture parts formed in the above composite mold will conform to the same dimensional standards as parts made in an all-silicone rubber mold and will have excellent grain detail due to the excellent grain detail on the silicone rubber surface of the mold. The material cost of the composite mold is approximately one-half that of an all-silicone rubber mold or less. The use of the liquid silicone rubber sprayed upon the master permits one to pick up the excellent grain detail from the master. A mold formed with sprayable silicone rubber may have the thickness of the silicone rubber surface varied, depending upon needs. Finally, while the composite mold is flexible to permit one to remove foamed polyurethane furniture parts from the mold, even furniture parts having undercuts, the mold backing is not compressed during the curing of the foamed polyrethane furniture part. If the backing of the composite mold were compressible, the pressure of the curing foamed polyurethane would compress the backing, and thus make it difficult to maintain tolerances.

What is claimed is:

1. A method of making a composite rubber mold comprising the steps of:

(a) spraying a silicone rubber compound on the surface of a master which is to be copied;
   (b) curing the silicone rubber covering over the master to be copied to form a layer with a thickness of 0.005 to 0.020 inches;
   (c) flame treating the back surface of the silicone rubber layer to make it receptive to bonding with other materials;
   (d) forming a solid non-compressible during molding use flexible polyurethane backing layer on the silicone rubber surface; and
   (e) permitting the composite plural layer mold to cure so that it may be subsequently used to mold articles in the shape of a master in the mold so constructed.

2. The molding method of claim 1 wherein the sprayable silicone rubber coating is placed over the master which is to be copied with areas of various thickness for the silicone rubber coating so formed.

3. The molding method of claim 1 wherein the silicone rubber compound is applied as plural coats.

* * * * *